(12) United States Patent
Izume (10) Patent No.: US 8,720,840 B2
(45) Date of Patent: May 13, 2014

(54) CONTAINER-SUPPORTING APPARATUS (75) Inventor: Tomoharu Izume, Yokohama (JP)

(73) Assignee: NIFCO Inc., Yokohama-shi (JP)

( * ) Notice: Subject to any disclaimer, the term of this patent is extended or adjusted under 35 U.S.C. 154(b) by 136 days.

(21) Appl. No.: 13/138,994

(22) PCT Filed: May 11, 2010

(86) PCT No.: PCT/JP2010/057975
§ 371 (c)(1),
(2), (4) Date: Jan. 20, 2012

(87) PCT Pub. No.: WO2010/131661
PCT Pub. Date: Nov. 18, 2010

(65) Prior Publication Data
US 2012/0111880 A1  May 10, 2012

(30) Foreign Application Priority Data

May 15, 2009 (JP) .................................. 2009-118502

(51) Int. Cl.
*A47K 1/08* (2006.01)
(52) U.S. Cl.
USPC .................... 248/311.2; 220/737; 224/926
(58) Field of Classification Search
USPC .......... 220/737, 812, 811, 810; 224/281, 926; 248/311.2, 27.1, 298.1
See application file for complete search history.

(56) References Cited

U.S. PATENT DOCUMENTS

| | | | | |
|---|---|---|---|---|
| 4,836,394 A * | 6/1989 | Glomski | ........................ | 220/811 |
| 6,059,097 A * | 5/2000 | Clopton | ........................ | 198/852 |
| 6,464,187 B1 * | 10/2002 | Bieck et al. | ................ | 248/311.2 |
| 6,685,152 B2 * | 2/2004 | Shirase et al. | ............ | 248/311.2 |
| 6,837,471 B2 * | 1/2005 | Izume | ........................ | 248/311.2 |
| 6,854,699 B2 * | 2/2005 | Nishizawa | ................ | 248/311.2 |
| 7,694,928 B2 * | 4/2010 | Lee et al. | ................... | 248/311.2 |
| 2005/0205590 A1 * | 9/2005 | Bastian et al. | ................ | 220/737 |
| 2006/0006185 A1 * | 1/2006 | Katagiri | ....................... | 220/740 |
| 2008/0054006 A1 * | 3/2008 | Yamamoto et al. | .......... | 220/737 |
| 2011/0259906 A1 * | 10/2011 | Shimajiri | ..................... | 220/737 |

FOREIGN PATENT DOCUMENTS

| | | |
|---|---|---|
| JP | 2003-063297 | 3/2003 |
| JP | 2005-306149 | 11/2005 |
| JP | 2008-062694 | 3/2008 |

* cited by examiner

*Primary Examiner* — Anthony Stashick
*Assistant Examiner* — James Way
(74) *Attorney, Agent, or Firm* — Manabu Kanesaka (57) ABSTRACT

A container-supporting apparatus includes a housing, a holder, a cup-supporting body, a flap, an elastic member for urging the flap in a direction of an insertion hole, a shaft part provided on either (for example, the flap) of the holder or the flap, and a shaft-bearing part provided on the other (for example, the holder) and provided with a shaft-bearing part capable of receiving the shaft part. When the holder is stored in the housing, the cup-supporting body contacts the flap whereby the shaft part moves inside the shaft-bearing hole of the shaft-bearing part.

10 Claims, 8 Drawing Sheets

CONTAINER-SUPPORTING APPARATUS

TECHNOLOGICAL FIELD

The present invention relates to a container-supporting apparatus, and is configured so that when a holder is stored in a housing, a cup-supporting body is brought into contact with a flap whereby the flap is moved, and rattling of the cup-supporting body inside the housing can be prevented.

BACKGROUND TECHNOLOGY

There is conventionally known a container-supporting apparatus configured so that when a holder is stored inside a housing, a cup-supporting body is lifted up, wherein a free end side of an elastic member is lifted up by the cup-supporting body and is deformed, and rattling of the cup-supporting body is furthermore suppressed (for example, see paragraph [0014] and FIG. 1 of Patent Document 1).

PRIOR ART DOCUMENTS

Patent Documents

Patent Document 1: Japanese Patent No. 3272047

SUMMARY OF THE INVENTION

Problem to be Solved by the Invention

However, although rattling of the cup-supporting body can be prevented by the abovementioned conventional elastic member when the holder is stored inside the housing, there is a problem that the elastic force declines due to degradation of the elastic member over time, and there is a possibility that rattling might occur.

The present invention has been thus created in consideration of the abovementioned problem of the prior art, and an object thereof is to provide an apparatus such that when a holder is stored in a housing, a cup-supporting body is brought into contact with a flap whereby the flap is moved, and rattling of the cup-supporting body inside the housing can be prevented.

Means for Solving the Problem

The present invention has been made in order to achieve the abovementioned object, and the present invention has the following features.

Firstly, the container-supporting apparatus has the following configuration.

(1) Housing

The housing has an open front face.

(2) Holder

The holder has an insertion hole for insertion of a cup, and is capable of moving in and out of the housing.

(3) Cup-Supporting Body

The cup-supporting body is for mounting a cup.

(4) Flap

The flap is for controlling rattling of the cup.

(5) Elastic Member

The elastic member is used for urging the flap in the direction of the insertion hole.

(6) Shaft Part

The shaft part is provided on either (for example, the flap) of the holder or the flap.

(7) Shaft-Bearing Part

The shaft-bearing part is provided on the other (for example, the holder), and is provided with a shaft-bearing hole capable of receiving the shaft part.

Although the shaft is provided on the flap and the shaft-bearing part is provided on the holder, the invention is not limited to this, and the shaft part may be provided on the holder and the shaft-bearing part may be provided on the flap.

Secondly, when the holder is stored in the housing, the cup-supporting body contacts the flap whereby the shaft part moves inside the shaft-bearing hole of the shaft-bearing part.

The present invention may have the following features.

When the cup-supporting body contacts with the flap, the shaft part moves inside the shaft-bearing hole in the direction that the holder moves out from the housing. Rattling of the cup-supporting body can be prevented by thus moving the flap in the direction that the holder moves out from the housing.

The present invention may have the following features.

The surface of contact between the cup-supporting body and the flap is formed to be inclined downward in the direction that the holder moves out. The flap can be moved positively in the direction that the holder moves out from the housing by thus forming the surface of contact between the cup-supporting body and the flap inclined downward in the direction that the holder moves out.

The present invention may have the following features.

The cross section of the shaft part and the cross section of the shaft-bearing hole are formed roughly in a D shape. The movement of the shaft part inside the shaft-bearing hole can be guaranteed smooth, and the hinge mechanism of the flap can be made compact, by thus forming the cross section of the shaft part and the cross section of the shaft-bearing hole roughly in a D shape.

Effect of the Invention

Because the present invention is configured as above, when the holder is stored in the housing, the cup-supporting body is brought into contact with the flap whereby the flap moves, and rattling of the cup-supporting body inside the housing can be prevented.

MODES OF WORKING OF THE INVENTION

In the drawings, numeral 10 indicates a container-supporting apparatus. Although not illustrated, the container-supporting apparatus 10 is installed, for example, inside a vehicle compartment of an automobile, and is used for holding a can, PET bottle, bottle, cup, glass, or other kind of cup.

Although an automobile is given as an example of a place of installation of the container-supporting apparatus 10, the invention is not limited to this, and the container-supporting apparatus may be installed in a train, airplane, ship, or other passenger vehicle, as well as inside a house, in furniture, office equipment, electrical appliances, or the like.

Specifically, the container-supporting apparatus 10 has the following parts, broadly divided, as illustrated in FIGS. 2 to 6.

The following (1) to (5) are described later.
(1) Housing 20
(2) Holder 30
(3) Projecting device 40
(4) Lock device 50
(5) Damping device 60

The parts of the container-supporting apparatus 100 are not limited to the above (1) to (5).

(Housing 20)

Figure 4:
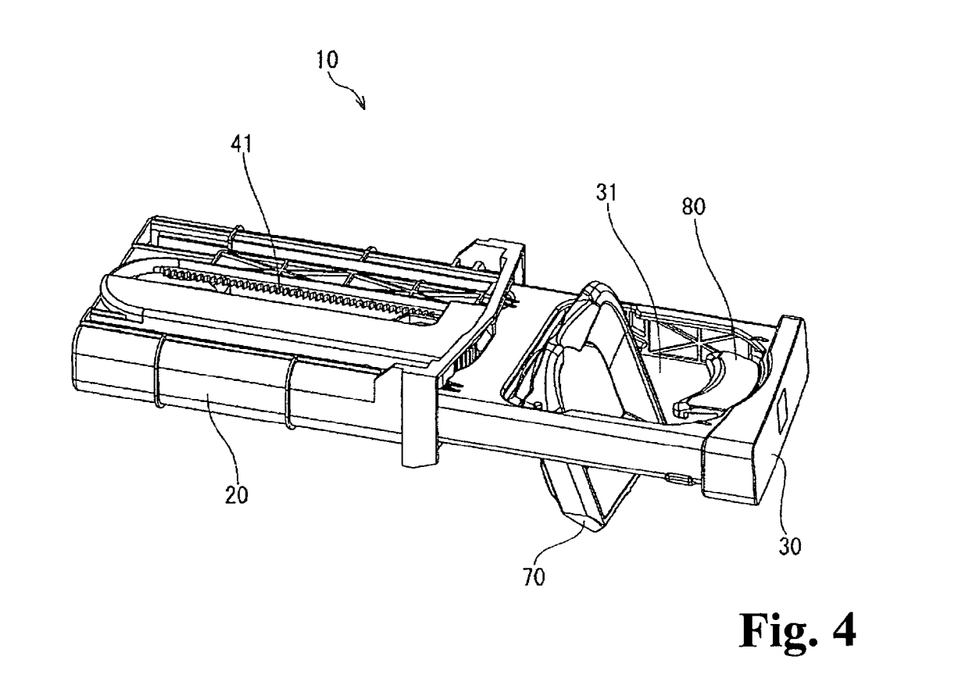
FIG. 4 is a perspective view of the container-supporting apparatus in the state in which the holder is drawn out from the housing.
Figure 5:
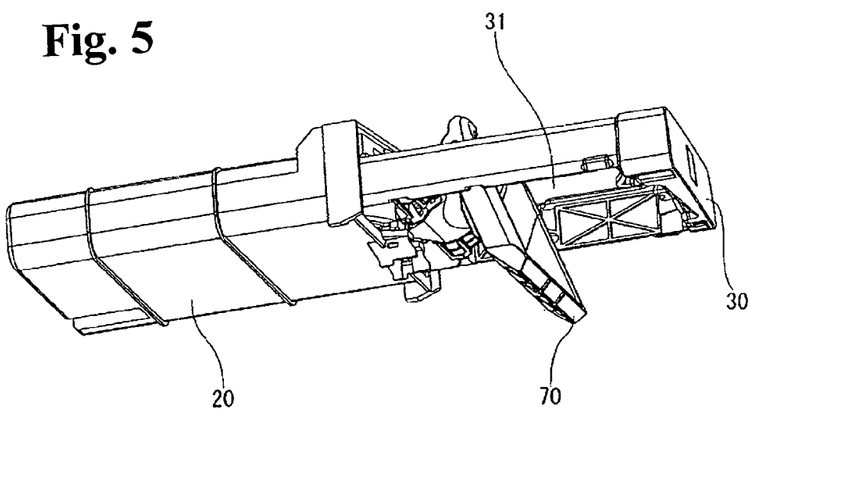
FIG. 5 is a perspective view of the container-supporting apparatus viewed from below with the holder drawn out from the housing.

The housing 20 has an open front face, as illustrated in FIGS. 4 and 5.

Specifically, the housing 20 is formed in a square tubular shape having open front and rear faces.

(Holder 30)

The holder 30 has an insertion hole 31 for insertion of a cup, and is capable of moving in and out of housing 20, as illustrated in FIGS. 2 to 6.

Figure 2:
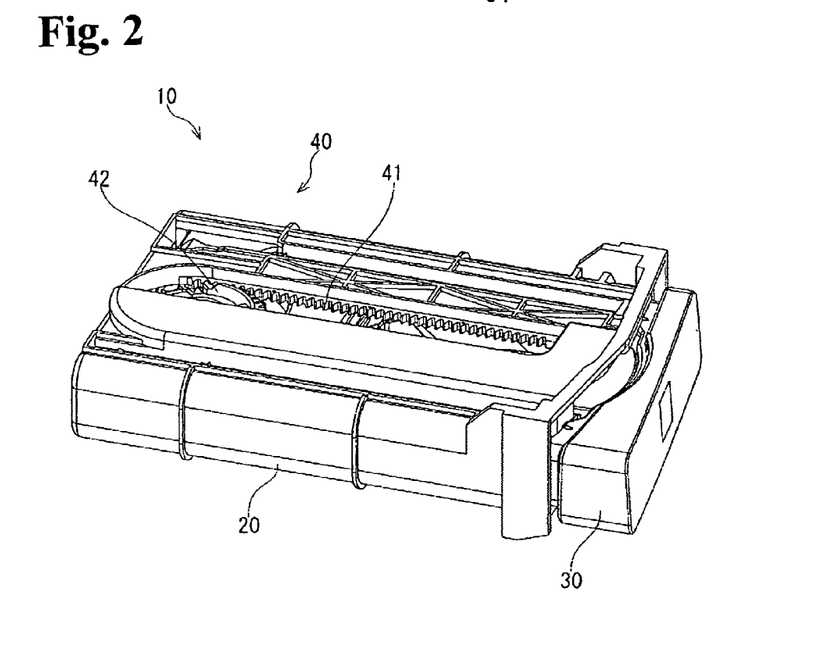
FIG. 2 is a perspective view of the container-supporting apparatus in the state in which the holder is stored inside the housing.
Figure 3:
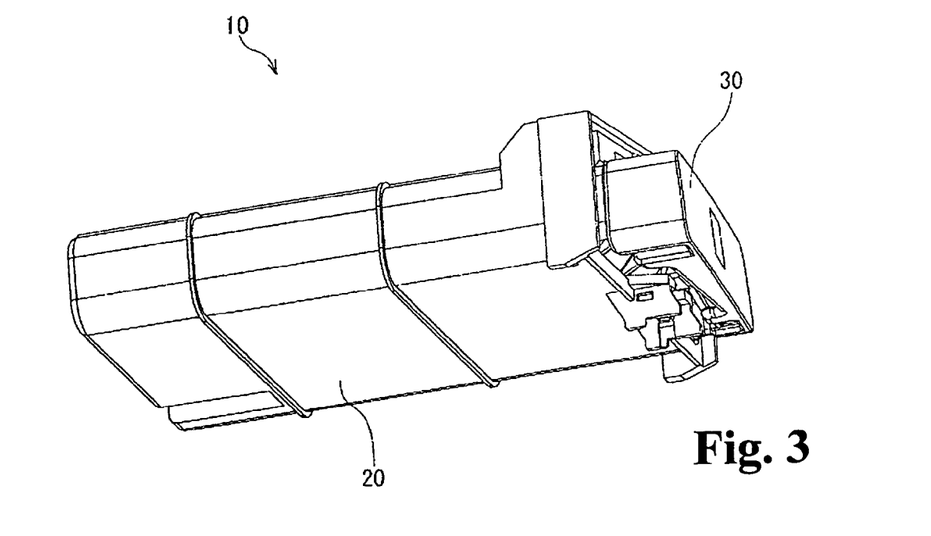
FIG. 3 is a perspective view of the container-supporting apparatus viewed from below with the holder stored inside the housing.

The holder 30 is formed in a board form, and a front part projects from the housing 20 in a state being stored inside the housing, as illustrated in FIGS. 2 and 3.

The insertion hole 31 runs through the upper and lower faces of the holder 30, and is formed roughly in a circular shape.

Specifically, the holder 30 has the following parts, broadly divided, as illustrated in FIGS. 4 to 7.

The following (1) and (2) are described later.
(1) Cup-supporting body 70
(2) Flap 80

The parts of the holder are not limited to the above (1) and (2).

(Projecting Device 40)

Figure 6:
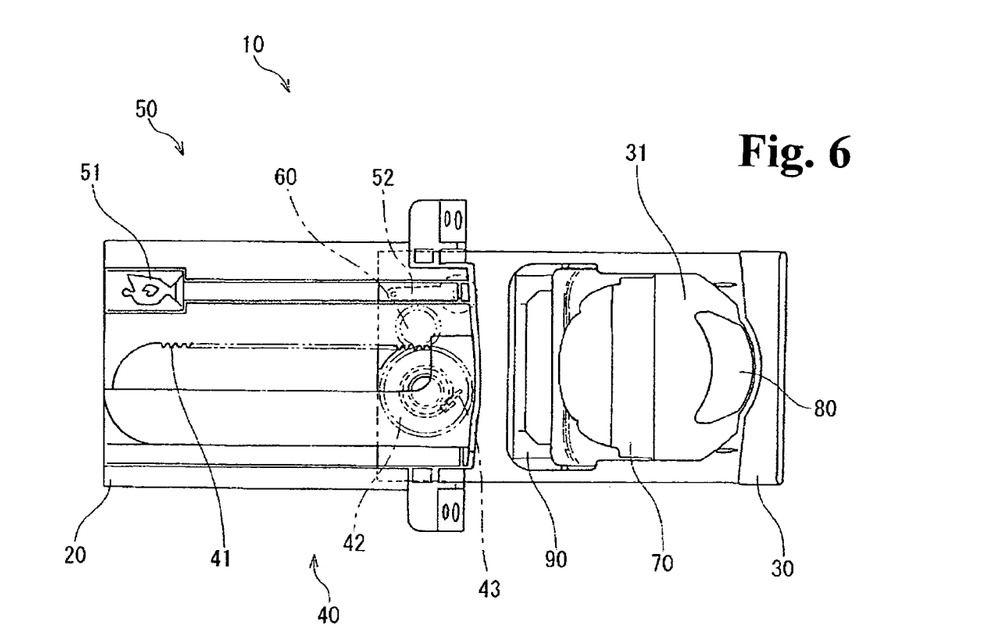
FIG. 6 is a plan view of the container-supporting apparatus in the state in which the holder is drawn out from the housing.
Figure 7:
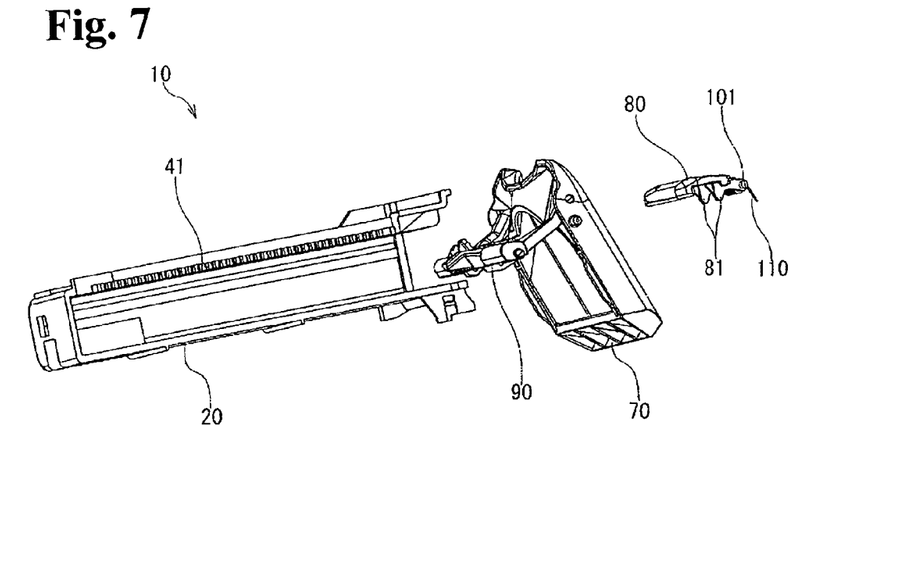
FIG. 7 is an exploded perspective view of the cup-supporting body, flap, and housing.

The projecting device 40 is used for urging the holder 30 stored inside the housing 20 in the direction of projection, to project the holder 30 from the opening on the front face of the housing 20, as illustrated in FIG. 6.

Specifically, the projecting device 40 has the following parts, broadly divided, as illustrated in FIG. 6.

The parts of the projecting device are not limited to the following (1) to (3).
(1) Rack 41

The rack 41 is formed on the housing 20 in the direction of sliding of the holder 30, as illustrated in FIG. 6.
(2) Gear 42

The gear 42 engages the rack 41, and is supported to be capable of rotation on a rear part of the holder 30, as illustrated in FIG. 6.
(3) Spring 43

The spring 43 is installed on an inner part of the gear 42, as illustrated in FIG. 6, and is used for applying rotational force to the gear 42 in the direction that the holder 30 projects from the housing 20. When the gear 42 rotates by the rotational force of the spring 43, the holder 30 moves in the direction to project from the open front face of the housing 20 by the engagement with the rack 41.

(Lock Device 50)

The lock device 40 is used for locking the holder 30 in the position being stored inside the housing 20, in opposition to the urging force of the projecting device 40, as illustrated in FIG. 6.

Specifically, the lock device 40 has the following parts, as illustrated in FIG. 6.

The parts of the lock device 40 are not limited to the following (1) and (2).
(1) Lock Trough The lock trough 51 is formed on the housing 20, as illustrated in FIG. 6.
(2) Lock Pin 52

The lock pin 52 traces the lock trough 51, and is supported to be capable of swiveling on the rear part of the holder 30, as illustrated in FIG. 6.

When the holder 30 is pushed inside the housing 20 from an in-use position, although not illustrated, the lock pin 52 is locked inside the lock trough 51 in the stored position of the holder 30. When the front part of the holder 30 projecting from the open front face of the housing 20 is pushed in toward the depth of the housing 20 in the stored position of the holder 30, the locked state is unlocked and the lock pin 52 disengages from the lock trough 51. At this time, the holder 30 is pushed out from the open front face of the housing 20 by the aforementioned projecting device 40.

(Damping Device 60)

The damping device 60 is used for damping the urging force of the projecting device 40, as illustrated in FIG. 6, and is configured, for example, as a rotary-type oil damper. The damping device 60, which is a rotary-type oil damper, engages the gear 42.

Therefore, when the gear 42 rotates by the rotational force of the spring 43, the damping force of the damping device 60, which is a rotary-type oil damper, operates, and the holder 30 projects slowly and silently.

(Cup-Supporting Body 70)

The cup-supporting body 70 is used for mounting a cup, as illustrated in FIGS. 4 to 7.

Specifically, the cup-supporting body 70 is supported to be capable of rotation on a front end part of an arm 90 having a base end part supported to be capable of rotation on the holder 30, and, in the position when the holder 30 is drawn out from the housing 20, rotates downward by its own weight at a position beneath the insertion hole 31. The arm 90 is supported on the rear side in the direction A of sliding of the holder 30 at the insertion hole 31 as a center. The cup-supporting body 70 is therefore inclined diagonally downward from the rear side to the front side of the insertion hole 31.

As opposed to this, when the holder 30 is stored inside the housing 20, the cup-supporting body 70 is pressed against a lower edge on the open front end of the housing 20 and is rotated upward, and is stored inside the housing 20 in a state being folded up in parallel with the holder 30.

(Flap 80)

The flap 80 is used for controlling rattling of the cup, as illustrated in FIGS. 4 to 8.

Specifically, the flap has the following parts.

The following (1) to (3) are described later (1) Hinge device 100

(2) Elastic member 110

(3) Projecting part 81

The parts of the flap 80 are not limited to the above (1) to (3).

(Hinge Device 100)

Figure 1:
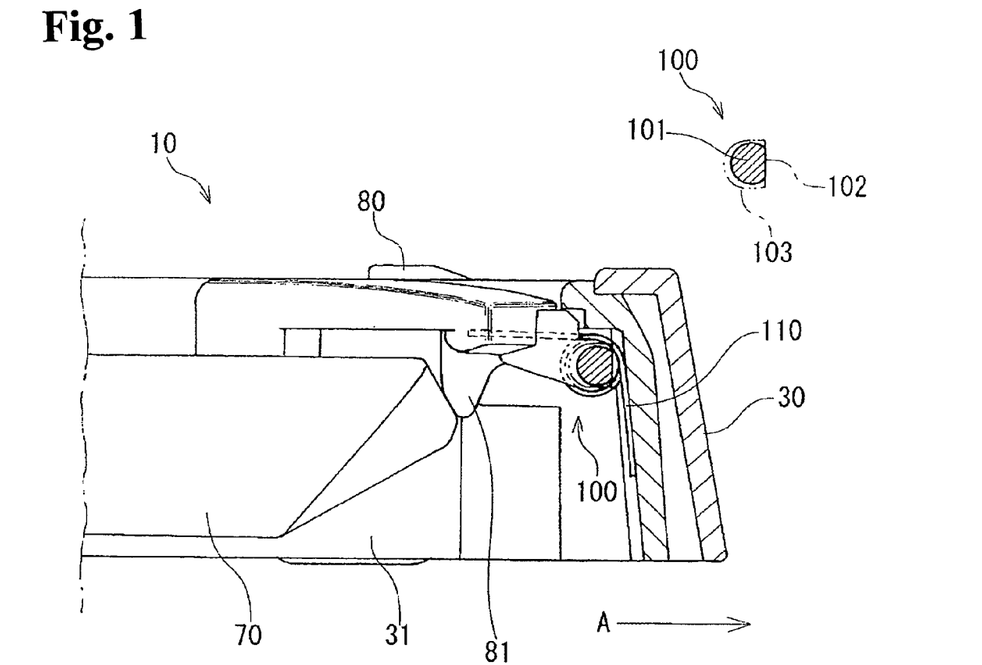
FIG. 1 is a partial sectional view of the state in which the holder is stored inside the housing, as well as a diagram for explaining the relationship between the shaft part and the shaft-bearing part.
Figure 10:
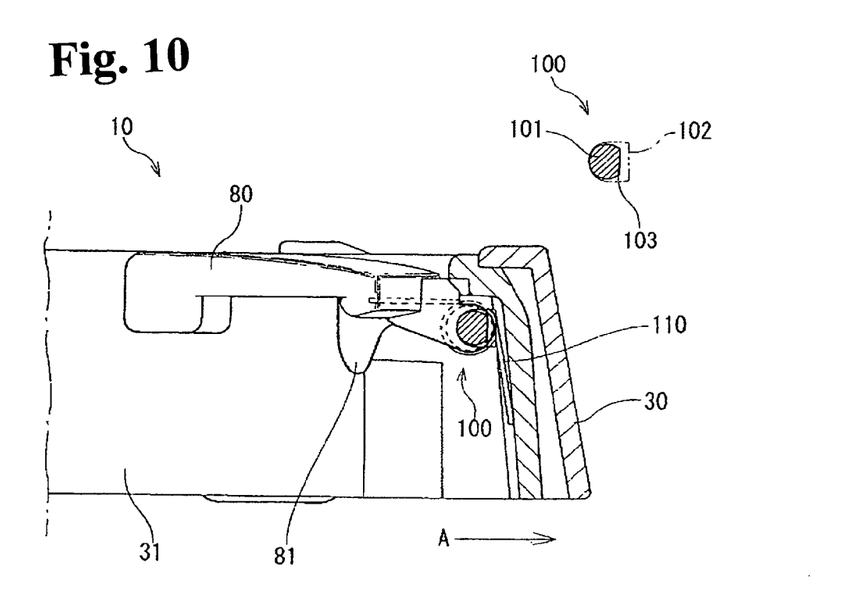
FIG. 10 is a partial sectional view of the holder in the state drawn out from the housing, as well as a diagram for showing the relationship between the shaft part and the shaft-bearing part.
Figure 11:
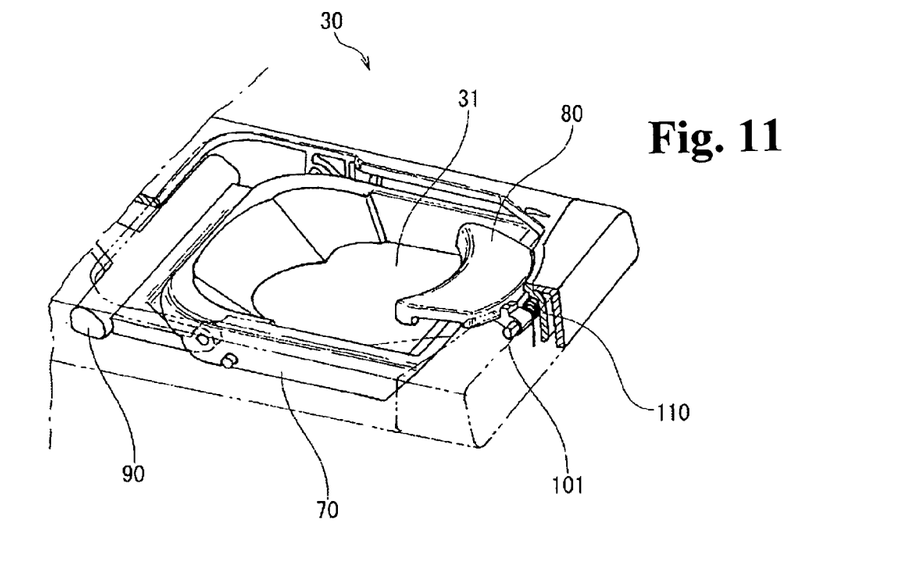
FIG. 11 is a partial perspective view of the holder in the state stored in the housing.

The hinge device 100 is used for supporting the flap 80 to be capable of rotation on an edge part of the insertion hole 31 of the holder 30, as illustrated in FIGS. 1 and 10.

Specifically, the hinge device 100 is formed by a shaft part 101 and a shaft-bearing part 102.

Figure 8:
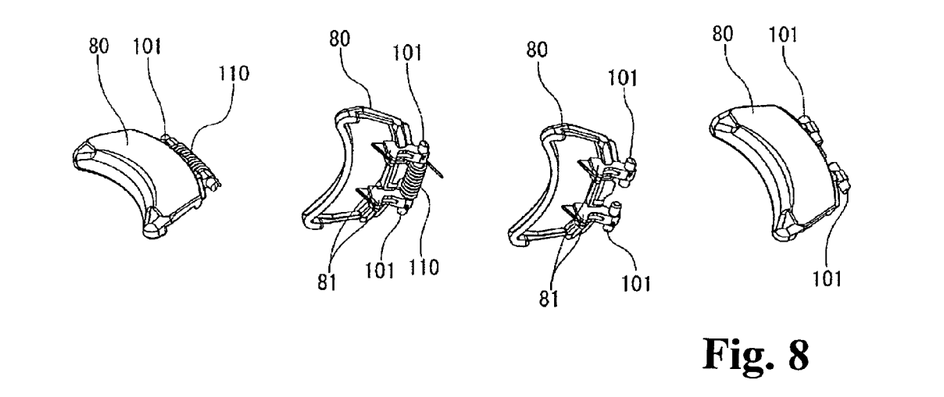
FIG. 8 is an exploded perspective view of the flap viewed from multiple directions.

The shaft part 101 is provided on either of the holder 30 or the flap 80, for example, on the flap 80. A pair of shaft parts 101 is formed separately on the left and right, as illustrated in FIG. 8. The shaft part 101 is formed roughly in a D shape in cross section, as illustrated in FIGS. 1 and 10.

The shaft-bearing part 102 is formed on the other of the holder 30 or the flap 80, for example, on the holder 30.

Although the shaft part 101 is provided on the flap 80 and the shaft-bearing part 102 is provided on the holder 30, the invention is not limited to this, and the shaft part 101 may be provided on the holder 30 and the shaft-bearing part 102 may be provided on the flap 80.

The shaft-bearing part 102 has a shaft-bearing hole 103 capable of receiving the shaft part 101, as illustrated in FIGS. 1 and 10. The shaft-bearing hole 103 is formed roughly in a D shape in cross section a size larger than the shaft part 101.

The roughly D-shaped shaft part 101 is fitted inside the likewise roughly flat-shaped shaft-bearing hole 103, so that the flat face thereof becomes in the same direction as the flat face of the shaft-bearing hole 103.

Also, the flat face of the shaft-bearing hole 103 is positioned toward the front in the direction A of projection of the holder 30.

The roughly D-shaped shaft part 101 is held to be capable of sliding from a position in which the curved face thereof is in contact with the curved face of the likewise roughly D-shaped shaft bearing hole 103 to a position in which the flat face of the shaft part 101 is in contact with the flat face of the shaft-bearing hole 103.

The reason why the shaft part 101 and the shaft-bearing part 103 are formed roughly in a D shape is because there is an advantage that the hinge device 100 can be designed more compactly as compared with the case when the two are formed in a circular shape in cross section, because the distance from the flat face to the curved face can be set shorter in the case when the two are formed roughly in a D shape, while ensuring a space in which the shaft part 101 can slide.

The shaft part 101 and the shaft-bearing hole 103 may be formed in a shape other than roughly D shaped, although the abovementioned advantage cannot be obtained.

(Elastic Member 110)

The elastic member 110 is used for urging the flap 80 in the direction of the insertion hole 31, as illustrated in FIG. 10.

Specifically, the elastic member 110 is configured with a coil spring, and is placed between the left and right shaft parts 101, as illustrated in FIG. 8.

The flap 80 is urged by the elastic member 100, which is a coil spring, so as to rotate upward on the shaft part 101 as a center, and is urged in the direction that the curved face of the roughly D-shaped shaft part 101 contacts the curved face of the roughly D-shaped shaft-bearing hole 103, as illustrated in FIG. 10.

(Projecting Part 81)

Figure 12:
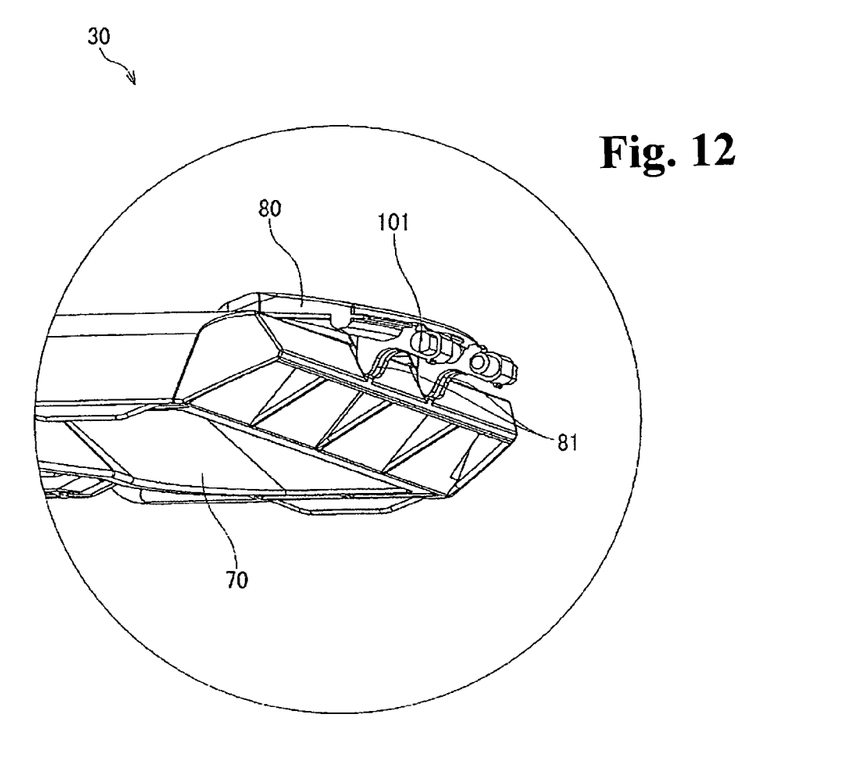
FIG. 12 is a partial perspective view of the cup-supporting body and the flap in the state in which the holder is stored in the housing.

The projecting part 81 contacts the cup-supporting body 70 in the state in which the holder 30 is stored inside the housing 20, as illustrated in FIGS. 1 and 12.

Specifically, a pair of projecting parts 81 is formed proximally to the left and right shaft, as illustrated in FIG. 8. Each projecting part 81 projects downward in a peak shape. Also, each projecting part 81 is molded with rigid thermoplastic resin and itself lacks elasticity.

Although a pair of projecting parts 81 is formed, the invention is not limited to this, and one or three or more may be formed. Also, although the projecting part 81 is formed in a peak shape, the invention is not limited to this, and it is sufficient that an inclined face be provided on the face contacting the cup-supporting body 70. Specifically, the configuration may be such that the flap 80 is pressed in the direction A of projection of the holder 30 by an inclined face on at least either one of the projecting part 81 and the cup-supporting body 70.

(Method of Use of Container-Supporting Apparatus 10))

The method of use of the container-supporting apparatus 100 having the abovementioned configuration is described.

First, in order to use the holder 30 stored inside the housing 20, the front face of the holder should be pushed inward slightly toward the depth of the housing 20, as illustrated in FIGS. 2 and 3.

When the holder 30 is pushed inward, the lock device 50 is unlocked and the holder 30 projects from the open front face of the housing 20 by the projecting device 40, as illustrated in FIGS. 4 to 6.

At this time, the damping device 60 operates and the holder 30 projects slowly and silently.

Figure 9:
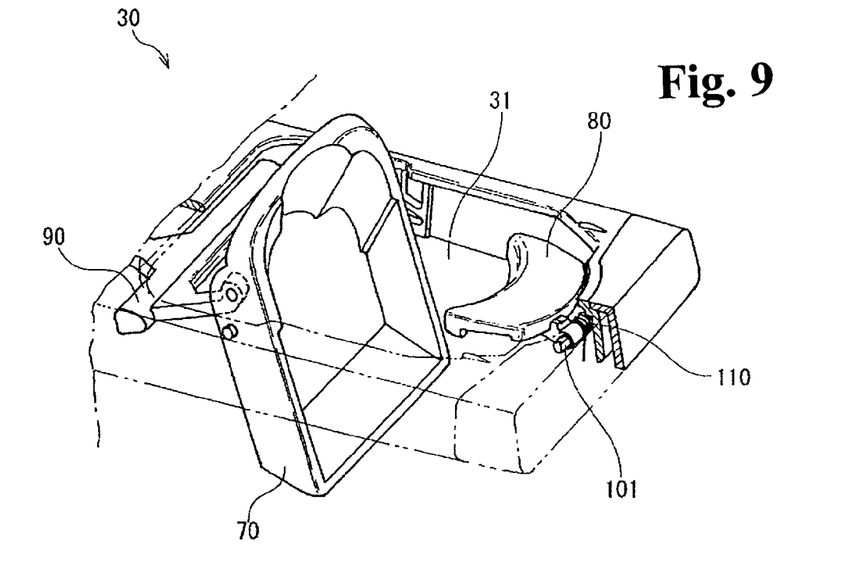
FIG. 9 is a partial perspective view of the holder in the state drawn out from the housing.

Also, when the holder 30 projects, the cup-supporting body 70 rotates downward by its own weight to a position beneath the insertion hole 31, as illustrated in FIGS. 4, 5, and 9.

Therefore, although not illustrated, the bottom of a cup inserted in the insertion hole 31 can be mounted on the cup-supporting body 70.

Also, although not illustrated, when a cup is inserted in the insertion hole 31, the flap 80 is pressed against the outer perimeter of the cup and rotates downward on the shaft part 101 as a center. The flap 80 elastically contacts the outer perimeter of the cup while operating as if to rotate upward by the impelling force of the elastic member 110, whereby rattling of the cup inside the insertion hole 31 is prevented.

Meanwhile, the flap 80 is urged by the urging force of the elastic member 110 in the direction that the curved face of the roughly D-shaped shaft part 101 comes into contact with the curved face of the roughly D-shaped shaft-bearing hole 103, as illustrated in FIG. 10.

(Method of Storage of Holder 30)

Meanwhile, when storing the holder 30, the holder 30 should be pushed inward toward the depth of the housing 20.

When the holder 30 is pushed inward, the holder 30 is locked by the lock device 50 in the position being stored inside the housing 20, as illustrated in FIGS. 2 and 3.

Also, when the holder 30 is pushed inward, the cup-supporting body 70 is pushed against the lower edge of the open front face of the housing 20 and rotates upward, and is stored inside the housing 20 in a state being folded up in parallel with the holder 30.

When the cup-supporting body 70 rotates upward, it comes to contact from beneath with the projecting part 81 of the flap 80, as illustrated in FIG. 1.

By contacting with the cup-supporting part 70, the flap 80 is pressed toward the direction A of projection of the holder 80 by way of the projecting part 81.

Therefore, the roughly D-shaped shaft part 101 slides toward the flat face of the roughly D-shaped shaft-bearing hole 103 from the position in which the curved face thereof is in contact with the curved face of the shaft-bearing hole 103. When the shaft part 101 slides inside the shaft-bearing hole 103, the sliding of the shaft part 101 stops at the position in which the flat face of the shaft part 101 comes into contact with the flat face of the shaft-bearing hole 103. At this time, the shaft part 101 is urged toward the curved face of the shaft-bearing hole 103 by the elastic member 110. Therefore, the cup-supporting body 70 is elastically pressed toward the bottom face of the housing 20 by the reaction force of the elastic member 110 by way of the projecting part 81, and rattling in the vertical direction of the cup-supporting body 70 inside the housing 20 is prevented.

(Second Embodiment)

Figure 13:
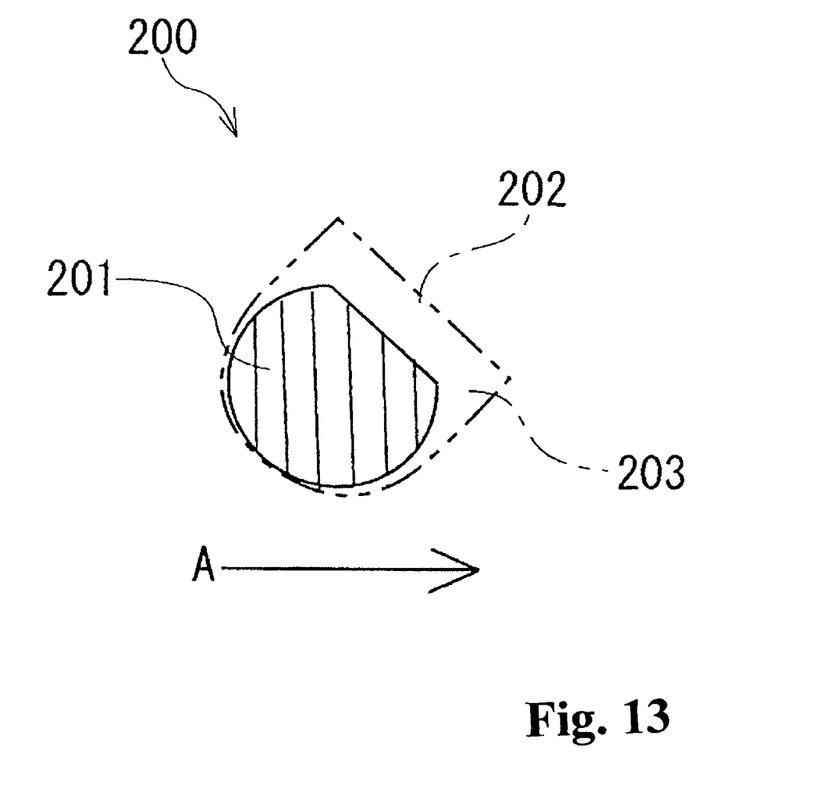
FIG. 13 is a diagram illustrating a second example of the present invention, for showing the relationship between the shaft part and the shaft-bearing part.
Figure 14:
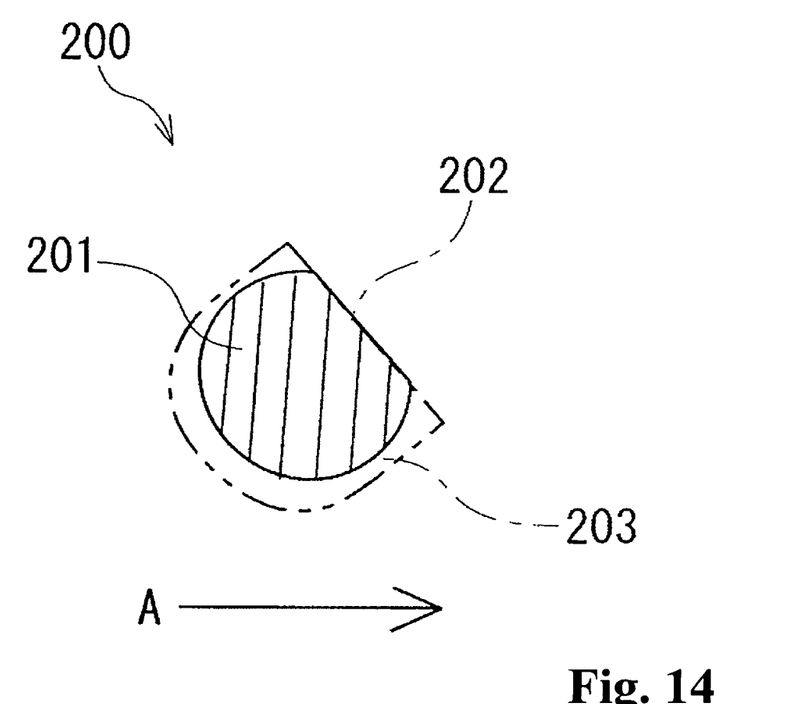
FIG. 14 is a diagram of the state in which the holder is stored in the housing, corresponding to FIG. 13.

An example of a second embodiment of the present invention is next described using FIGS. 13 and 14.

The features of the embodiment reside in the improvement of the hinge device 200.

Specifically, the shaft part 201 is configured to be capable of sliding diagonally upward inside the shaft-bearing hole 203 of the shaft-bearing part 202. Even in the case when the shaft part 201 is configured to be capable of sliding diagonally upward, rattling in the vertical direction of the cup-supporting body 70 inside the housing 20 can be prevented in the same manner as in the case of the first embodiment previously described by using FIGS. 1 to 12.

Although the shaft part 201 is configured to be capable of sliding diagonally upward, the invention is not limited to this, and although not illustrated, the shaft part 201 may be configured to be capable of sliding vertically, and in this case as well, rattling in the vertical direction of the cup-supporting body 70 inside the housing 20 can be prevented in the same manner as in the case of the first mode of working.

The entire contents of the specification, claims, drawings, and abstract of Japanese Patent Application No. 2009-118502 are incorporated by reference herein as a disclosure of the specification of the present invention.

What is claimed is:

1. A container-supporting apparatus, comprising:
   a housing having an open front face;
   a holder capable of moving in and out of the housing, and having an insertion hole for insertion of a cup;
   a cup-supporting body configured to mount the cup, and having a contact part at an end part thereof;
   a flap configured to control rattling of the cup, and having a projecting part at an end part of the flap;
   an elastic member configured to urge the flap in a direction of the insertion hole;
   a shaft part provided on one of the holder and the flap; and
   a shaft-bearing part provided on the other of the holder and the flap and having a shaft-bearing hole capable of receiving the shaft part,
   wherein when the holder is stored in the housing, the contact part of the cup-supporting body contacts and pushes the projecting part of the flap so that the shaft part moves inside the shaft-bearing hole of the shaft-bearing part, and
   when the shaft part moves inside the shaft-bearing hole, the elastic member urges the shaft part so that the cup-supporting body is elastically pressed toward the housing by a reaction force of the elastic member through the projecting part to prevent rattling of the cup-supporting body.

2. The container-supporting apparatus according to claim 1, wherein when the cup-supporting body contacts the flap, the shaft part moves inside the shaft-bearing hole in a direction that the holder moves out from the housing.

3. The container-supporting apparatus according to claim 2, wherein a surface of contact between the cup-supporting body and the flap is formed to be inclined downward in the direction that the holder moves out.

4. The container-supporting apparatus according to claim 3, wherein a cross section of the shaft part and a cross section of the shaft-bearing hole are formed roughly in a D shape.

5. The container-supporting apparatus according to clam 1, wherein the shaft-bearing hole has a cross-sectional area which is larger than a cross-sectional area of the shaft part.

6. The container-supporting apparatus according to clam 4, wherein the shaft-bearing hole has a cross-sectional area which is larger than a cross-sectional area of the shaft part.

7. The container-supporting apparatus according to claim 1, wherein the flap has the projecting part on a bottom side of the flap.

8. The container-supporting apparatus according to claim 7, wherein the projecting part projects downward in a peak shape.

9. The container-supporting apparatus according to claim 7, wherein the projecting part is a pair of projection parts aligned with the shaft-bearing part.

10. The container-supporting apparatus according to claim 5, wherein the elastic member is a coil spring and urges the shaft inside the shaft bearing hole in a direction away from a front portion of the holder.

* * * * *